Figure 1:
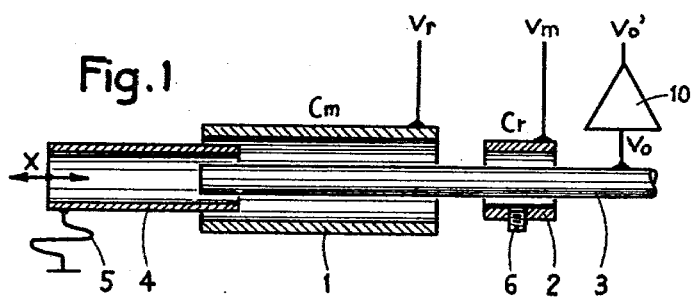

United States Patent [19]

Meyer

[11] 4,206,401
[45] Jun. 3, 1980

[54] LENGTH MEASURING SYSTEM

[76] Inventor: Hans U. Meyer, Chemin de la Rochelle, 10, Prilly, Vaud, Switzerland

[21] Appl. No.: 896,070

[22] Filed: Apr. 13, 1978

[30] Foreign Application Priority Data

Apr. 20, 1977 [CH] Switzerland ............... 4882/77

[51] Int. Cl.$^2$ ............................................. G01R 27/02
[52] U.S. Cl. ..................................................... 324/61 R
[58] Field of Search ............................ 324/61 R, 61 P

[56] References Cited

U.S. PATENT DOCUMENTS

| | | | |
|---|---|---|---|
| 2,978,638 | 4/1961 | Wing et al. | 324/61 R X |
| 3,631,430 | 12/1971 | West | 324/61 R X |
| 3,845,377 | 10/1974 | Shimotori | 324/61 R X |
| 3,857,092 | 12/1974 | Meyer | 324/61 R |
| 3,928,796 | 12/1975 | Kaiser | 324/61 R |

Primary Examiner—Stanley T. Krawczewicz
Attorney, Agent, or Firm—Edwin E. Greigg

[57] ABSTRACT

An electrical length-measuring system comprises two capacitors and electronic means for obtaining an indication voltage proportional to the displacement. The measuring capacitor, whose capacitance is varied in a linear manner by the displacement to be measured, is connected to a reference a.c. voltage, whilst the reference capacitor with the same dielectric is connected to a measuring a.c. voltage of the same frequency and opposite phase, whose amplitude can be varied by electronic means in such a way that the a.c. voltage induced on an electrode common to both capacitors becomes zero, forcing the measuring a.c. voltage to be proportional to the displacement.

Preferably the capacitance change of the measuring capacitor is brought about by an earthed screen inserted between both electrodes. In the system specifically described and illustrated, the measuring capacitor comprises two coaxial cylindrical electrodes and a coaxial cylindrical screen is inserted axially between the electrodes as a function of the displacement.

In the described and illustrated system also, the a.c. voltages are of a rectangular nature, making it easy to eliminate errors due to transient couplings.

14 Claims, 3 Drawing Figures

LENGTH MEASURING SYSTEM

The invention relates to a length-measuring system comprising two capacitors and electronic means in order to obtain an indication voltage precisely proportional to a length displacement.

Known capacitive length-measuring systems can be subdivided into two categories. The first category consists of length-measuring systems whose transducers comprise a variable capacitor. Such transducers have a very simple construction, but are however very sensitive to changes in the dielectric. The second category consists of length-measuring systems whose transducers comprise a differential capacitor and are consequently independent of changes to the dielectric. Transducers of the second type also allow compensation measuring methods, which significantly increase the measuring precision and lack of sensitivity to external influences. In a known method (U.S. Pat. No. 3,857,092) the transducer a.c. voltages at two electrodes of a differential capacitor are varied in such a way that the voltage excited on the third, common electrode, becomes zero, leading to a linear relationship between transducer voltages and displacement.

The object of the invention is to combine the constructional advantages of the simple capacitive system with the measuring advantages of the differential capacitive system in one length measuring-system.

According to the invention, this is achieved in that a measuring capacitor, whose capacitance is linearly modified by the displacement to be measured, is connected to a reference a.c. voltage, and a reference capacitor with the same dielectric is connected to an alternating voltage of the same frequency and opposite phase, called the measuring a.c. voltage, and that the amplitude of the measuring a.c. voltage can be varied by electronic means in such a way that the a.c. voltage induced on an electrode which is common to both capacitors becomes zero.

The advantage of said measure is that the transducer of a length-measuring system according to the invention is quite smaller than in the case of a differential capacitive system. This is particularly the case if the capacitance change of the measuring capacitor is brought about by a grounded screen inserted between both electrodes. Such an arrangement is very advantageous in the case of a transducer according to the invention, because it reacts with relatively limited sensitivity to guidance errors and is also advantageous for the electrical connections. As opposed to this, a differential capacitive transducer of known construction has a more complicated design because in this case the field lines must be intersected at two locations and not one. Furthermore, in the case of a measuring transducer according to the invention, the purposively incorporated pre-amplifier can be kept very simple and consequently very small, because it only serves as an impedance transformer in order to pass a corrective signal varying around zero to the remaining electronics. Thus, the input capacitance of this pre-amplifier has no significant influence on the measuring and reference capacitances, so that very small values of less than one picofarad are possible for the latter.

An embodiment of the length-measuring system according to the invention is described in greater detail and by way of example only with reference to the accompanying drawings wherein:

FIG. 1 shows in section the constructive principle of a measuring transducer according to the invention.

Figure 2:
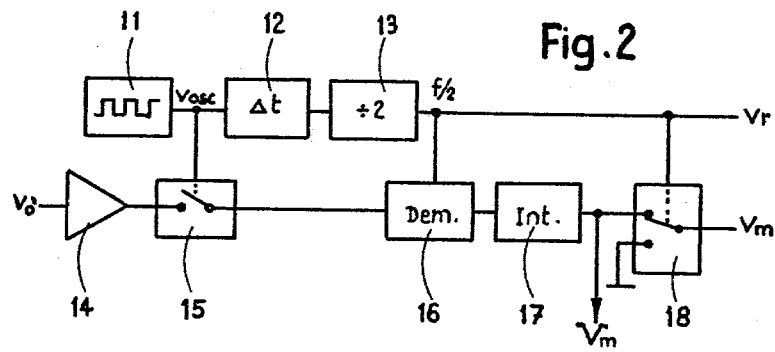

FIG. 2 the block diagram of the processing electronics embodied in this invention.

Figure 3:
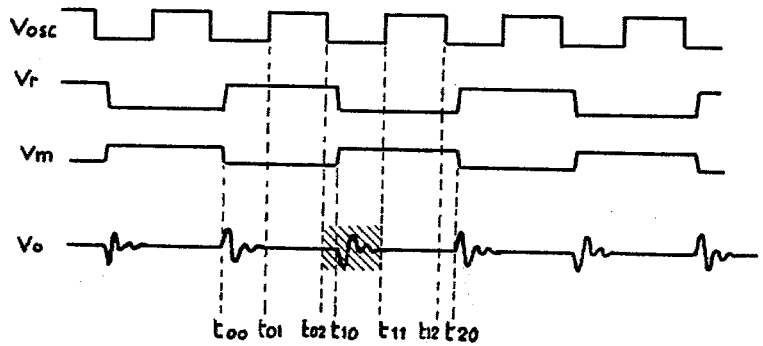

FIG. 3 the voltages in the electronics shown in FIG. 2 as a function of time.

As can be seen in FIG. 1, cylindrical electrodes 1 and 3 form a measuring capacitor $C_m$, whilst cylindrical electrodes 2 and 3 form a reference capacitor $C_r$. Whereas, reference capacitor $C_r$ remains constant, the measuring capacitor $C_m$ is linearly modified by the displacement X to be measured. This modification can be obtained in various ways, e.g. by a relative displacement of electrodes 1 and 3 or, as shown in FIG. 1, by inserting a screen 4, corresponding to the displacement X to be measured and which therefore brings about a capacitance change proportional to this displacement. The latter method has two advantages: firstly the thus constructed transducer is substantially insensitive to guidance errors of the screen, particularly with a cylindrical construction as in FIG. 1, and secondly the electrical connections to electrodes 1 and 3 are fixed, whilst screen 4 as the only movable part must be at the noncritical zero potential by means of a contact or movable line 5, whereby the latter may be a restoring spring.

Electrode 1 is excited by a constant a.c. voltage $v_r$, called the reference a.c. voltage, and electrode 2 by a variable a.c. voltage $v_m$, called the measuring a.c. voltage. The measuring a.c. voltage $v_m$ is varied by the electronic means described hereafter in such a way that the a.c. voltage $v_o$ induced on the common electrode 3 becomes zero. In this case, the sum of the capacitive currents flowing from electrode 3 is equal to zero, i.e.:

$$i_{cm} + i_{cr} = 0,$$

so that in the case of a.c. voltages of the same type and frequency:

$$v_r c_m + v_m \cdot c_r = 0$$

or $$v_m = -c_m/c_r v_r$$

Thus, $v_m$ is in a linear relationship to the displacement X because the measuring capacitance $C_m$ is proportional to the displacement X. In addition, changes to the dielectric constant have no influence if $C_m$ and $C_r$ have the same dielectric, e.g. air.

The described arrangement of the electrodes also permits in simple manner the calibration of the transducer sensitivity by adjusting the reference capacitance $C_r$, e.g. by means of a set screw 6, thus changing the ratio of the voltage change to the length change. This gives the possibility of alternately connecting different transducers to a common electronic processing unit without the need to recalibrate each time.

In order to ensure a completely satisfactory operation of a length-measuring system according to the invention, the voltage $v_o$ induced on a common electrode must naturally only be generated by the voltages $v_r$ and $v_m$ acting through the capacitors $C_m$ and $C_r$. This means that the line which transmits $v_o$ from the transducer to the remaining electronics must be carefully screened from the lines carrying the exciting voltages $v_r$ and $v_m$. A better and cheaper solution is provided by placing a simple impedance transformer 10 in the transducer. The construction of such an impedance transformer is known and does not present any particular problems because the amplification factor is not critical. However, even with low output impedance of the impedance transformer 10, couplings of the exciting a.c. voltages $v_r$ and $v_m$ can have an effect on the voltage $v_{o'}$ on the output side, which can lead to disturbing phase errors in the case of sinusoidal voltages.

However, if the exciting voltages $v_r$ and $v_m$ are square-wave voltages, the undesired couplings and time-lags appear as transients. These transients are produced by the flanks of the square waves and decay so that after a given settling time their disturbing action becomes negligible. Thus, it is sufficient to take no account of the excited voltage $v_o$ during this transient time.

This is for example achieved by the electronics shown in FIG. 2. The voltage $v_{o'}$ of impedance transformer 10 is applied to the input amplifier 14 which amplifies the signal to a level suitable for further processing. It is advantageous to construct input amplifier 14 as a current-voltage transformer so as to reduce the impedance on the input side substantially to zero. Thus, the transients on the line are suppressed and this eliminates any associated fault due to possible feedback through the impedance transformer 10 to its input.

An oscillator 11 produces a square wave $v_{osc}$ whose flanks define times $t_{01}$, $t_{02}$, $t_{11}$ and $t_{12}$ in the time-voltage diagram of FIG. 3. Square wave $v_{osc}$ is coupled to the frequency divider 13 so that a square wave with half the frequency and slightly delayed with respect to $v_{osc}$ appears at the output of this frequency divider or flip-flop. This square wave is used as the reference a.c. voltage $v_r$, with the assumption that its amplitude is constant. This is ensured by selecting a logic, whose output level is clearly defined, e.g. CMOS. The measuring a.c. voltage $v_m$ is produced by alternatively switching between a subsequently defined measuring d.c. voltage $V_m$ and a constant potential, in this case ground. The electronic single pole double throw switch 18 is controlled by the reference a.c. voltage $v_r$ and is wired up in such a way that the so generated measuring a.c. voltage $v_m$ has a phase opposed to the reference a.c. voltage $v_r$, i.e. it is reversed. FIG. 3 shows the phase relationships between the oscillator voltage $v_{osc}$ and the two voltages $v_r$ and $v_m$. The flanks of the reference a.c. voltage $v_r$ are representated by times $t_{00}$, $t_{10}$ and $t_{20}$. The flanks of the measuring a.c. voltage $v_m$ approximately coincide with these times. If the two a.c. voltages $v_r$ and $v_m$ were perfect square-wave voltages with a phase displacement of precisely 180° and if there were no couplings, the a.c. voltage $v_o$ obtained on the common electrode 3 (FIG. 1) could be set precisely to zero by suitable regulation. As was shown herein before, the measuring a.c. voltage $v_m$ and consequently the measuring d.c. voltage $V_m$ would then have a linear relationship to the displacement X to be measured. As such ideals conditions cannot be achieved, transients after the switching times $t_{00}$, $t_{10}$ and $t_{20}$ appear on the induced a.c. voltage $v_o$. A transient suppressor 15 is inserted between input amplifier 14 and synchronous demodulator 16 to suppress these transients. In the simplest case, this transient suppressor is an electronic switch, controlled by the voltage $v_{osc}$ in such a way that the switch is opened at the time $t_{11}$, just before the appearance of the transient (e.g. $t_{02}$ in FIG. 3), until said transient decays. Since, due to the time lag element 12 the voltage $v_{osc}$ assumes the level corresponding to the open state just before the flanks of voltages $v_r$ and $v_m$ and maintain this level for a sufficient time, a signal free from said transients is supplied to the synchronous demodulator 16, which has the advantage, as in the ideal case, that the signal is set by regulating means to the theoretically correct zero value. In the present example, said regulating means comprises a simple integrator 17 which is connected behind the demodulator 16. If the demodulated signal differs from zero, the output voltage $V_m$ of the integrator will change as a function of the amplitude and polarity of the demodulated signal. As said output voltage is the measuring d.c. voltage $V_m$, the measuring a.c. voltage $v_m$ varies correspondingly until the voltage at the integrator input reaches zero. The thus obtained measuring d.c. voltage is therefore in a linear relationship to the displacement X and is consequently usable as the measuring d.c. voltage of said displacement X.

The displacement X can now be displayed by means of an analogue or digital voltmeter applied to the measuring d.c. voltage $V_m$ or can undergo further processing.

I claim:

1. In an electrical length-measuring system comprising two capacitors and electronic means for obtaining an indication voltage proportional to the displacement, the improvement comprising:

connecting a measuring capacitor, whose capacitance will be varied in linear manner by the displacement to be measured, to a reference a.c. voltage;

connecting a reference capacitor with the same dielectric to a measuring a.c. voltage of the same frequency and opposite phase as said reference a.c. voltage;

and varying the amplitude of said measuring a.c. voltage by electronic means in such a way that the a.c. voltage induced on an electrode common to both capacitors becomes zero.

2. The improvement of claim 1, further characterised in that said d.c. voltages are square-wave voltages, and in that the reference a.c. voltage is produced by switching alternately between two constant d.c. voltages and the measuring a.c. voltage by switching alternately between a constant d.c. voltage and a variable measuring d.c. voltage.

3. The improvement of claim 2, further characterised by varying said measuring d.c. voltage by electronic means in such a way that the voltage induced on the common electrode, apart from any transient voltages produced during each switching operation, becomes zero.

4. The improvement of claim 3, further characterised in that said electronic means comprise a transient suppressor, a synchronous demodulator and an integrator.

5. In an electrical length-measuring system comprising two capacitors and electronic means for obtaining an indication voltage proportional to the displacement, the improvement comprising:

connecting a measuring capacitor, whose capacitance will be varied in linear manner by the displacement to be measured, to a reference a.c. voltage;

connecting a reference capacitor with the same dielectric to a measuring a.c. voltage of the same frequency and opposite phase as said reference a.c. voltage;

varying the amplitude of said measuring a.c. voltage by electronic means in such a way that the a.c voltage induced on an electrode common to both capacitors becomes zero;

and modifying the capacitance of the measuring capacitor by inserting at least one earthed screen as a function of the displacement to be measured between the electrodes.

6. The improvement of claim 5, further characterised in that the measuring capacitor comprises two coaxial cylindrical electrodes and a coaxial cylindrical screen is inserted axially between the electrodes as a function of the displacement.

7. The improvement of claim 5, further characterised in that said d.c. voltages are square-wave voltages, and in that the reference a.c. voltage is produced by switching alternately between two constant d.c. voltages and the measuring a.c. voltage by switching alternately between a constant d.c. voltage and a variable measuring d.c. voltage.

8. The improvement of claim 7, further characterised by varying said measuring d.c. voltage by electronic means in such a way that the voltage induced on the common electrode, apart from any transient voltages produced during each switching operation, becomes zero.

9. The improvement of claim 7, further characterised in that said electronic means comprise a transient suppressor, a synchronous demodulator and an integrator.

10. In an electrical length-measuring system comprising two capacitors and electronic means for obtaining an indication voltage proportional to the displacement, the improvement comprising:
connecting a measuring capacitor, whose capacitance will be varied in linear manner by the displacement to be measured, to a reference a.c. voltage;
connecting a reference capacitor with the same dielectric to a measuring a.c. voltage of the same frequency and opposite phase as said reference a.c. voltage;
varying the amplitude of said measuring a.c. voltage by electronic means in such a way that the a.c. voltage induced on an electrode common to both capacitors becomes zero;
incorporating an impedance transformer into the transducer; and
connecting said impedance transformer on its input side to the common electrode and on its output side to the remaining electronics of the system.

11. The improvement of claim 10, further characterized in that said d.c. voltages are square-wave voltages, and in that the reference a.c. voltage is produced by switching alternately between two constant d.c. voltages and the measuring a.c. voltage by switching alternately between a constant d.c. voltage and a variable measuring d.c. voltage.

12. The improvement of claim 11, further characterised by varying said measuring d.c. voltage by electronic means in such a way that the voltage induced on the common electrode, apart from any transient voltages produced during each switching operation, becomes zero.

13. The improvement of claim 12, further characterised in that said electronic means comprise a transient suppressor, a synchronous demodulator and in integrator.

14. The improvement of claim 10, further characterised by modifying the capacitance of the measuring capacitor by inserting at least one earthed screen as a function of the displacement to be measured between the electrodes.

* * * * *